Sept. 30, 1969    R. L. HORST    3,470,561
SPHERICAL LUNEBERG LENS
Original Filed Aug. 2, 1965    2 Sheets-Sheet 1
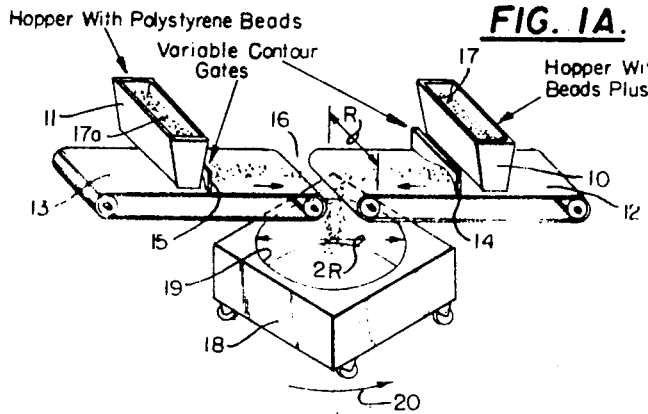
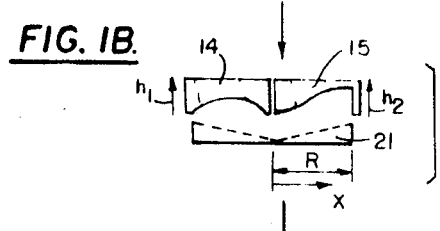
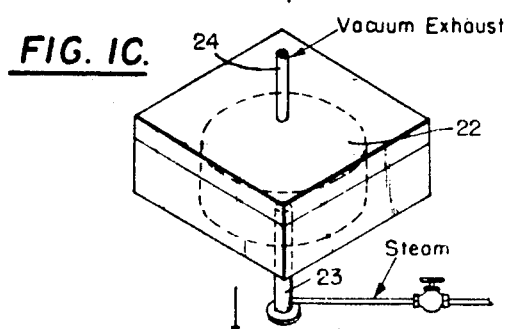
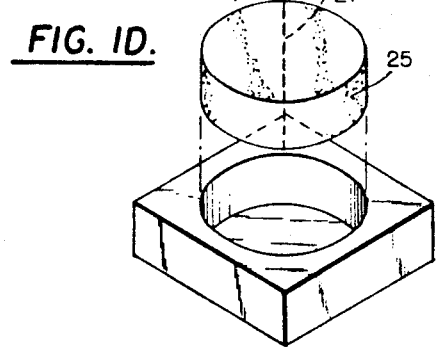
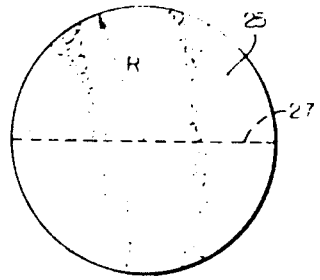
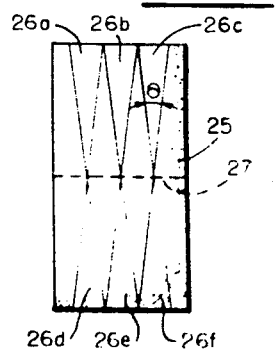
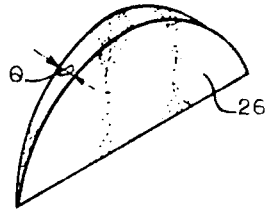
INVENTOR
Robert L. Horst
ATTORNEYS

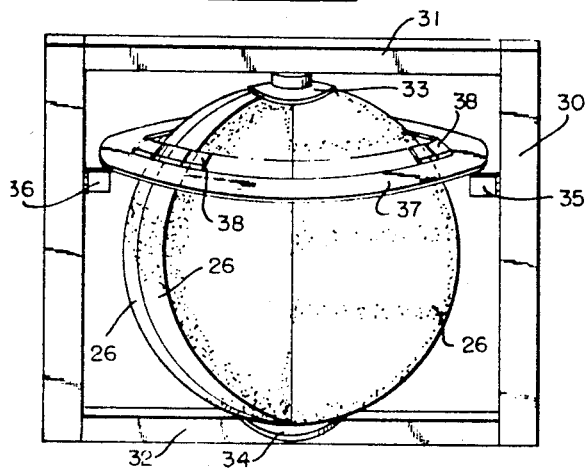
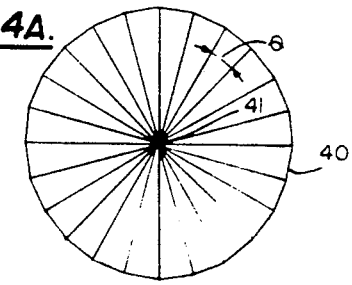
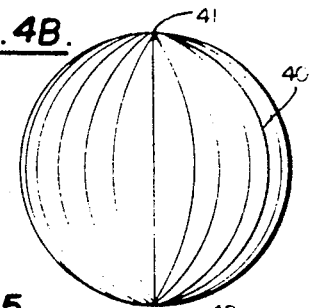
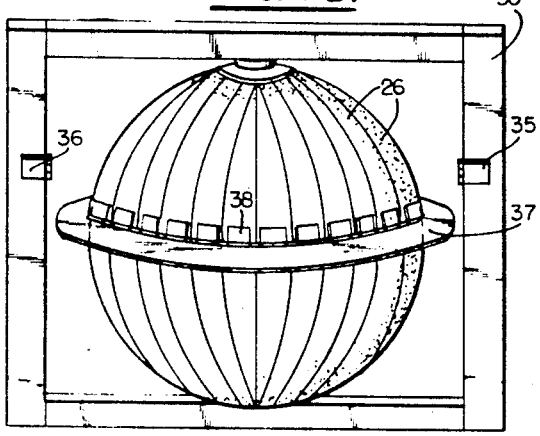
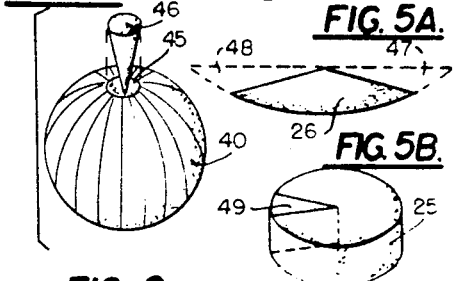
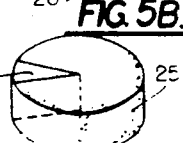
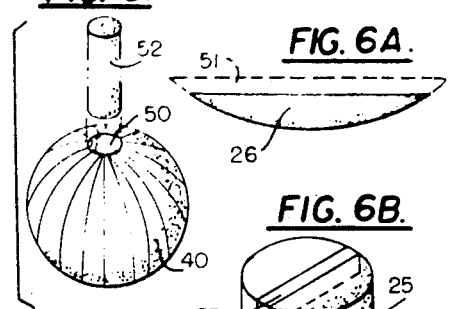
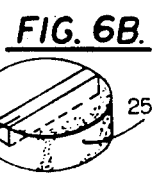
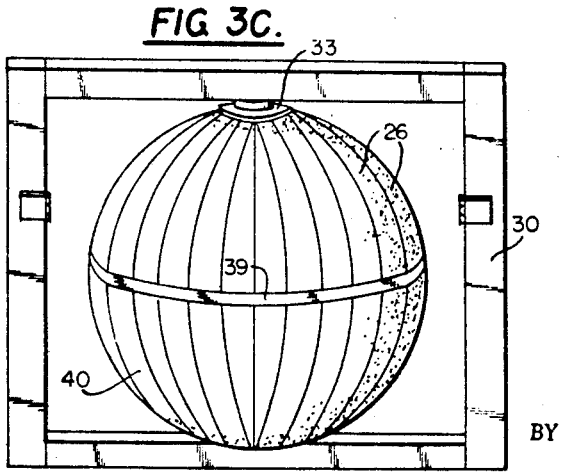
INVENTOR
Robert L. Horst

United States Patent Office 3,470,561
Patented Sept. 30, 1969

3,470,561
SPHERICAL LUNEBERG LENS
Robert L. Horst, Lancaster, Pa., assignor to Armstrong Cork Company, Lancaster, Pa., a corporation of Pennsylvania
Application Aug. 2, 1965, Ser. No. 477,669, now Patent No. 3,274,668, dated Sept. 27, 1966, which is a continuation-in-part of application Ser. No. 209,075, July 11, 1962. Divided and this application Apr. 13, 1966, Ser. No. 567,021
Int. Cl. H01q 15/08
U.S. Cl. 343—911
7 Claims

ABSTRACT OF THE DISCLOSURE

A substantially spherical dielectric lens comprises a plurality of orange-slice shaped wedges disposed in side by side relation to one another. Each wedge exhibits a variation in dielectric constant in directions normal to its thickened edge, and each wedge exhibits substantially the same density at all portions thereof between its thickened and thin edge.

---

This application is a division of my prior copending application Ser. No. 477,669, filed Aug. 2, 1965, now Patent No. 3,274,668 for "Three-Dimensional Dielectric Lens and Method of Forming the Same," which is, in turn, a continuation-in-part of my prior copending application Ser. No. 209,075, filed July 11, 1962, now abandoned.

The present invention relates to an improved wedge module technique for fabricating an improved dielectric lens, e.g., a Luneberg lens, a Maxwell lens, an Eaton lens, or the like, characterized by a dielectric constant and hence a refractive index which varies as a function of the lens coordinates. The lens of the present invention may take the form of so-called step-function or stepped-index lenses or, in the alternative, the novel lens of the present invention may exhibit a substantially continuous gradation of dielectric constant, without significant dielectric discontinuities either at the surface of the lens or in its interior, whereby the lens is adapted to effect a performance more nearly approaching theoretical performances than has been possible heretofore.

During the last decade, there have been numerous attempts at the fabrication of high quality dielectric lenses for use at high radio frequency, and particularly at frequencies in the microwave portion of the spectrum. One such dielectric lens suggested heretofore is the so-called Luneberg lens, a lens which may be either two-dimensional in form, e.g., substantially cylindrical, or three-dimensional in form, e.g., substantially spherical, depending on the focus desired and the configuration of the feed antenna. In the case of three-dimensional dielectric lens, Luneberg has shown that, in theory, if electromagnetic energy in the form of a plane wave impinges upon the lens, said electromagnetic energy will be refracted and concentrated at substantially a point focus positioned on the surface of the lens. Luneberg has further shown, since reciprocity applies, that energy injected into the device at the point focus mentioned will similarly be refracted and transmitted as a plane wave.

In order for the lens to operate in the manner described, Luneberg has taught that the refractive index ($n$) of a three-dimensional lens should vary as a function of the radial coordinates ($r$) of the lens according to an equation which reduces to:

$$n = \sqrt{2 - \left(\frac{r}{R}\right)^2} \qquad (1)$$

where R is the lens radius. Based upon the results of Luneberg's work, subsequent workers in the field have shown that, by appropriate modification of the dielectric gradation, the actual position of the focus at the lens (Luneberg has shown that a second focus would also exist, in theory, at infinity) may be shifted to other positions either interior of the lens or spaced externally of the lens surface.

As will be appreciated from the formula given above, the dielectric constant or refractive index of the lens should vary continuously as a function of the lens radial coordinates if operation according to the theoretical is to be achieved. To the present time, however, no practical techniques have been suggested for fabricating a dielectric lens having such a continuously varying dielectric constant. Accordingly, it is the practice at the present time to fabricate such lens by assembling various lens subcomponents (e.g., blocks of material, concentric cylinders, or shells, etc.) to effect a step-wise approximation of the theoretical refractive index gradation.

The step construction techniques prevalent at the present time are accompanied by a number of distinct disadvantages. It has been found, for example, that the subcomponents previously employed, e.g., blocks, shells, etc., in a stepped-index lens necessarily have different dielectric constants; and when the various subcomponents are assembled, dielectric discontinuities result at the abutting junctions of the subcomponents with attendant reflections and dispersive losses at these junctions. Refinement of such a lens necessitates reduction of the dielectric step size, thereby requiring constructional modules of smaller dimensions. The consequent increase in the number of modules employed obviously serves to further complicate the interface problem, in that a multiplicity of junctions exists, each of which represents a dielectric discontinuity and as such is a reflecting plane. The fractional reflected power for wave (normal) incidence at such dielectric interface is described by the well-known relationship $$R^2 = \frac{(n_1 - n_2)^2}{(n_1 + n_2)^2}$$

where R is the reflection coefficient and $n_1$, $n_2$ are the refractive indices of the two mediums; similar expressions describe reflection for arbitrary angles of incidence and are presented in many texts on electromagnetic field theory, e.g., "Electromagnetic Fields and Waves," R. V. Langmuir. The undesired reflections always accompany the desired wave refraction and are by no means insignificant as can be seen by evaluation of the equations noted.

In an effort to avoid these dispersive losses, various alternative techniques have been suggested for assembling three-dimensional lenses wherein the various subcomponents employed exhibit a dielectric gradation of sorts within each such subcomponent. One such suggestion made heretofore involves the assembly of small angle lunar wedge segments (e.g., something in the order of 180 such wedges, each subtending substantially a 2° angle) into a substantially spherical structure. The wedges are formed by initially fabricating thin segments of dielectric material and by then variably compressing these thin segments to achieve a dielectric gradation. The wedges formed by such a technique must necessarily have a small dihedral angle in order to achieve a proper dielectric gradation during compression thereof (i.e., as mentioned previously, an angle of substantially 2°), and a relatively large number of modules is accordingly required to assemble a complete lens. With such a technique, while in theory dielectric discontinuities do not exist, the very large number of interfaces which necessarily occur within the lens affords opportunity for wave scatter as a result of imperfections (dielectric error, air gaps, cement joints, etc.) produced during the lens assembly. Moreover, there has been an even more serious problem in this prior suggestion for fabricating a three-dimensional lens from such thin, variably compressed lunar segments in that the resulting three-dimensional lens, has been found to be anisotropic, i.e., the actual variation in dielectric constant has been found to be a function of aspect whereby a given incremental unit of the lens exhibits different dielectric constants in different directions. Such anisotropic lenses produce rotation of the field vectors during propagation of energy through the lens medium, whereby the polarization and velocity of a transmitted or received wave is altered in the lens. This phenomenon, commonly termed "birefringence," of itself has caused the resulting lens to depart in operation from that taught by Luneberg, since one theoretical advantage of a Luneberg lens is that the polarization of a propagated wave is not affected.

An additional consideration in the construction and application of any lens is its ultimate weight. A lens constructed by the above variable compression technique will by necessity be a "heavy" lens as compared to one fabricated by the techniques of the present invention, to be described. It may be shown by manipulation of the empirical equation describing the refractive index $(n)$ as a function of (polystyrene) density $(d)$ in lbs./cu. ft.

$$n = \sqrt{1 + 0.02d}$$

and Equation 1, supra, that the weight $(w)$ in lbs. of such lens will be $$w = \frac{4\pi}{0.15} R^3$$

where R is the lens radius in feet. The average density regardless of sphere size is approximately 20 lbs./cu. ft.

The present invention obviates the various problems mentioned, and produces a novel lens structure wherein the lens dielectric constant may be caused to vary substantially continuously as a function of the lens radial coordinates in accordance with any particular formula which may be selected for any particular lens. Moreover, the present invention contemplates an improved technique for forming wedges whereby, even if a stepped index lens is to be fabricated, the final lens employs fewer wedges than have been considered necessary with wedge techniques suggested heretofore, thereby reducing problems of wave scatter and also reducing the time and cost needed to fabricate and assemble the lens. Of equal importance, the novel lens of the present invention, whether exhibiting a continuous or stepped dielectric constant gradation, is isotropic, thereby distinguishing the lens from prior variable density lens which have necessarily been anisotropic. In short, the present invention achieves a novel three-dimensional lens which is adapted to receive and transmit incident radiation in a fashion more closely approximating the theoretical than has been possible heretofore.

It is, accordingly, an object of the present invention to provide an improved three-dimensional dielectric lens, of substantially spherical or other appropriate configuration, having a dielectric constant which preferably exhibits a uniformly varying gradation in a substantially constant density medium. In the specific example to be described hereinafter, the fabrication of a Luneberg lens will be described; but as will be apparent, the technique here involved may be utilized in the fabrication of dielectric masses having optical configurations other than those specifically contemplated by Luneberg.

Another object of the present invention resides in the provision of an improved three-dimensional dielectric lens which minimizes and, in many cases eliminates, dielectric discontinuities, wave reflections, and energy losses which have characterized step-function dielectric lenses fabricated heretofore.

Still another object of the present invention resides in the provision of an improved dielectric lens which exhibits a substantially smooth and continuous variation of refractive index in a variably loaded substantially constant density artificial dielectric medium, whereby said lens eliminates the problems of anisotropy which have characterized varying density three-dimensional lenses of types suggested heretofore, and whereby said lens further achieves radiation patterns and wave refractions more nearly approximating theoritical operations than has been possible in the past.

A still further object of the present invention resides in the provision of a novel fabrication technique for fabricating three-dimensional dielectric lenses exhibiting the various advantages described.

Another object of the present invention resides in the provision of a novel technique for forming wedge modules, of either continuous or stepped dielectric gradation, for use in fabricating dielectric lenses.

Still another object of the present invention resides in the provision of a technique for forming lenses from a smaller number of wedge modules, each exhibiting a larger dihedral angle, than has been considered possible heretofore.

A still further object of the present invention resides in the provision of an isotropic dielectric lens fabricated of dielectric wedge modules, as well as in techniques for fabricating such wedge modules more readily, and at less cost, than has been the case heretofore.

In achieving the various objects and advantages described above, the present invention contemplates the fabrication of a body of artificial dielectric material having, in its preferred form, a substantially continuous variation of dielectric constant and refractive index in three dimensions, effected by means of a variably loaded artificial dielectric medium. As will also appear, the body being fabricated can also initially exhibit a stepped dielectric gradation. The artificial dielectric employed preferably consists of an array of randomly oriented metallic particles supported by a low density dielectric material. The metallic particles may, for example, comprise insulated aluminum slivers preferably of substantially needle shape, and preferably having a length less than 1/8th wavelength. The supporting matrix in turn may take the form of a low loss polystyrene material, e.g., low density polystyrene beads or spheroids also preferably less than 1/8 wavelength in size, with a typical such material comprising, for example, commercially available "Armalite," a trademark of the Armstrong Cork Company, Lancaster, Pennsylvania. Composite loaded materials of this type simulate an actual dielectric when immersed in an electromagnetic field. In particular, the impressed field operates in a conventional dielectric medium to set up submicroscopic dipoles which serve to alter the velocity of propagation of waves therein; and in an artificial dielectric material of the type described, this principal effect is achieved macroscopically by the aforementioned conductive particles, with the randomly oriented metallic slivers operating to delay waves in the medium.

In fabricating a lens of the type contemplated by the present invention, with metallic-obstacle artificial dielectric materials of the type described, or with other appropriate dielectric materials, a cylindrical mass exhibiting a variation in dielectric constant is first created. Such a cylindrical mass can be fabricated by assembling plural concentric rings of different dielectric constant material, whereby the starting mass has a stepped gradation. In a preferred form of the present invention, however, a substantially continuous two dimensional variation in dielectric gradation is achieved in the starting mass by utilizing a cross-feeding system or technique. More particularly, in practicing this preferred form of the invention, and using an artificial dielectric material, a mass of dielectric beads interspersed with flakes or slivers of aluminum (whereby the composite mass exhibits a dielectric constant greater than unity), can be cross-fed with a lower index dielectric medium, comprising, for example, plain polystyrene beads identical to those which serve as the vehicle for the metallic slivers. Similarly, in using conventional dielectric materials, a high dielectric constant materal may be cross-fed with a substantially unity dielectric material. These two flowing streams of dielectric material, respectively having dielectric constants greater than and substantially equal to unity, may be fed into a charge box of appropriate geometry, e.g., a substantially cylindrical charge box, through contoured gates associated respectively with the flowing streams and operative to appropriately vary the loading in the combined streams flowing into the charge box. The charge box is rotated as the cross-fed material is fed therein, and this rotation cooperating with the contoured gates mentioned previously, assure that the desired continuously varying index as well as a uniform depth of material is effected in the charge box.

As mentioned, a similar cross-feeding technique may be employed to effect a charge of true dielectric material (rather than a sliver loaded artificial dielectric material) having the desired continuously varying index. Such a true dielectric material may comprise, for example, a mixture of polystyrene particles having different densities. Thus, again using a cross-feeding technique as described, one of the two flowing streams may comprise foamed polystyrene particles, and the other stream may comprise unfoamed polystyrene particles; and these streams may, in the manner described, be fed to a substantially cylindrical charge box, e.g., via appropriate contoured gates, to achieve the desired two-dimensional variation in refractive index from the center of said charge box to its outer edge.

The substantially smooth lay-up of true or artificial dielectric material effected in the aforementioned charge box, having the desired continuous two-dimensional dielectric constant gradation therein, is then fused into a unitary substantially cylindrical mass, for example, by a steam molding process. The cylindrical mass thus produced may then be unmolded and heat-treated for an appropriate extended period of time to effect the removal of all moisture and also to insure dimensional stability in the final device preparatory to the next steps in the fabrication process.

In accordance with these next steps, the cylindrical mass, exhibiting its two-dimensional variation in dielectric gradation is sliced, e.g., by a band saw, into a plurality of accurately dimensioned lunar wedges similar to "orange slices" with each such wedge being so shaped in relation to the original two-dimension dielectric gradient cylinder as to exhibit a varying dielectric constant throughout its body. In particular, each such wedge exhibits a continuously varying dielectric constant in radial directions, notwithstanding the fact that the dielectric medium comprising said wedge is of substantially constant density. A number of such wedges of identical configuration, and if desired having their surfaces appropriately finished to eliminate physical discontinuities, are then assembled in much the manner of an orange. The fabrication and assembly steps may additionally include certain shaping of the "orange slices" in the pole areas of the final lens, or throughout a centrally cored section of said lens, and the additional use of pole or core segments in association with these shaped lens areas, all to reduce physical discontinuities in certain parts of the lens particularly vulnerable to breakage and/or misalignment.

The overall technique produces a three-dimensional lens exhibiting a good approximation of spherical symmetry and a continuously varying dielectric gradation in three dimensions. In a typical case, 24 wedges each subtending an angle of 15°, or 36 wedges each subtending an angle of 10°, can be employed; but in its broader aspects, the improved spherical lens of the present invention may be considered to comprise $(y)$ sections described by $y/2$ great circles with common intersections, and with inclinations to one another of $\theta$ (where $\theta = 360°/y$), the actual values of the parameters $(y)$ and $\theta$ being determined primarily by the manufacturing capabilities available and the approximations which it is desired to tolerate.

The final lens thus comprises an assembled plurality of two-dimensional wedges, fabricated of a true or artificial dielectric material, with a substantially uniform dielectric gradation being achieved in each such wedge, and as a result in the overall lens, by an appropriate variation of the loading element or material concentration. The lens itself is isotropic, thereby achieving a significant improvement over three-dimensional lenses suggested heretofore. Moreover, since the incremental dielectric constants at adjacent abutting faces of successive ones of said wedges are substantially the same, and since a much smaller number of larger dihedral angle wedges is used than has been considered necessary in wedge module techniques suggested heretofore, the lens of the present invention eliminates or materially reduces dielectric discontinuities which have characterized step-index lenses suggested heretofore. Reflections and attendant losses are thus substantially eliminated on the interior of the lens; and indeed, the external surface of the lens, being comprised of substantially plain polystyrene foam only, closely approximates the dielectric constant of surrounding air so as also to minimize reflections and losses at the lens-air boundary.

The foregoing objects, advantages, construction and operation of the present invention will become more readily apparent from the following description and accompanying drawings, in which:

FIGURE 1A is a diagrammatic view showing a cross-feeding apparatus used in the preparation of a cylindrical mass of artificial dielectric material having characteristics useful to the fabrication technique of the present invention;

FIGURE 1B is an illustrative view of the contoured gates, and of certain considerations relating thereto, employed in the arrangement of FIGURE 1A;

FIGURES 1C and 1D are illustrative views showing further steps in the fabrication of a cylindrical mass having a continuously varying dielectric constant;

FIGURES 2A, 2B and 2C show successive steps in the formation of wedge modules from a cylindrical mass of the type fabricated by the steps of FIGURES 1A through 1D inclusive, or from a cylindrical mass fabricated by some alternative technique such as a stepped-index technique;

FIGURES 3A, 3B and 3C show an apparatus which may be employed in the assembly of wedges of the type shown in FIGURE 2C, as well as successive steps in the assembly of such wedges into a three-dimensional lens of the type contemplated by the present invention;

FIGURES 4A and 4B are illustrative polar and side views of the assembled three-dimensional lens of the present invention;

FIGURES 5, 5A and 5B show certain additional fabrication steps which may be effected to alleviate discontinuity problems in the polar regions of the assembled lens of FIGURES 4A and 4B; and FIGURES 6, 6A and 6B show still other additional fabrication steps which may be used to alleviate discontinuity problems in the polar and central core regions of the lens shown in FIGURES 4A and 4B.

As discussed previously, the initial part of the fabrication technique contemplated by the present invention contemplates that a starting mass of two-dimensionally graded material first be prepared, with this starting mass, in a preferred embodiment of the present invention, being of substantially cylindrical configuration. Such a starting mass may be formed by any approprite technique, including a stepped-index technique wherein plural different dielectric constant modules (e.g., concentric different diameter rings) are assembled into a cylindrical mass. However, a highly preferred technique for forming the starting mass is that illustrated in sequence in FIGURES 1A through 1D, inclusive; and this preferred technique will therefore be described in detail hereinafter. This preferred technique for forming the starting mass should not be considered limitative of my invention, however, since alternative forms of starting masses (including stepped-index cylinders) can be used during the wedge-module formation steps to be described subsequently in reference to FIGURES 2A through 2C.

In accordance with my preferred technique for fabricating a starting mass, a uniform control blend of artificial dielectric material, for example, of the sliver-loaded type previously described, may be used to form a fully fused solid cylindrical mass having a substantially continuous refractive index variation in radial directions. These circular units, formed for example by the technique of FIGURES 1A through 1D, may be of any appropriate dimension depending upon the size of the final three-dimensional lens described; and in one practical embodiment, the cylindrical masses formed by the technique to be described were approximately eighteen inches in height, and approximately three feet in diameter. The cylindrical masses formed by the technique of FIGURES 1A through 1D are in themselves operational two-dimensional Luneberg lenses; but differ from prior such two-dimensional lenses suggested heretofore in their uniform dielectric gradient, as well as in the fact that previous lenses of this configuration, of both stepped-index form and otherwise, have ordinarily taken the form of extremely short cylinders having a height much less than their diameter whereby a severe limitation has been imposed on the type of feed antenna which could be employed.

In fabricating the uniformly graded cylindrical masses which are employed in the preferred lens formation techniques of the present invention, a blend feeder employing a dilution technique is preferably employed. To this effect, a pair of hoppers 10 and 11 associated with a pair of aligned conveyors 12 and 13 and with a pair of appropriately contoured gates 14 and 15 effect a substantially constant flow of varyingly loaded dielectric material to a central discharge point 16. Hopper 10 contains a pre-mixed blend 17 of polystyrene beads and aluminum slivers, having a dielectric constant greater than 1; and in particular having a dielectric constant of $\epsilon_{max}$, the maximum dielectric constant required by the final lens. In a typical case, this high index blend 17 may have a dielectric constant of 1.92. The hopper 11 in turn contains a diluent 17a having a low index dielectric material therein comprising, for example, plain polystyrene particles identical to those which serve as the vehicle for the metallic slivers in blend 17; and in a typical case, the dielectric constant of the plain polystyrene beads in hopper 11 may be 1.03.

While it has been indicated that the mixed blend 17 is contained in a hopper 10 as a pre-mixed batch of material, even more accuracy in the final product can be achieved by replacing hopper 11 with a preliminary pair of conveyors and hoppers adapted, by a diluent technique similar to that shown in FIGURE 1A, to effect a highly accurate blend having the desired dielectric constant, e.g., 1.92. To this effect, the hopper 10 may be replaced by a further pair of auxiliary conveyors associated in turn with a further pair of hoppers. One of these further hoppers may contain a batch of blended polystyrene particles and aluminum slivers having a dielectric constant higher than that desired of the material on conveyor 12; and the second of these hoppers may contain plain polystyrene beads. The material in these two hoppers may be fed along said two auxiliary conveyors through automatically controlled uniform or linear-edge gates, the vertical positions of which may be variably changed with changes in the actual dielectric constant of the material passing along at least one of said conveyors. The gate control can be achieved by an appropriate sensing circuit, all as shown, for example, in my prior U.S. Patent No. 3,149,650 issued Sept. 22, 1964 for "Admittance Meter and Dielectric Control System." With this further refinement, the initially mixed blend would be discharged from the aforementioned auxiliary conveyors onto conveyor 12 at a position equivalent to the discharge end of hopper 10; and by the arrangement described, an extremely accurate control of the dielectric constant of the mixed blend passing along conveyor 12 would then be achieved. This, however, represents a refinement which is not essential to the present invention; and the actual arrangement shown in FIGURE 1A, utilizing a pre-mixed blend in hopper 10, gives entirely adequate results.

The material in the hoppers 10 and 11 passes, as described previously, through contoured gates 14 and 15 to discharge point 16 whereupon the resulting mixed blend of relatively high index and relatively low index dielectric material is dumped into a charge box (or mold) 18 having a substantially cylindrical recess 19. The width of each of conveyors 12 and 13, and each of the gates 14 and 15, is chosen to be equal to the radius of the final planned lens; and is similarly chosen to equal a radius of the recess 19 in charge box 18. Alternately, conveyors of width equal to the cylinder width may be employed provided, of course, that gates of appropriate width and contours be used, e.g., each of the radial length gates to be described may be expanded to diameter length by adding, to each such gate, a further gate section contoured as the mirror image of the gate actually shown and to be described.

The aligned conveyors 12 and 13 are so positioned with respect to charge box 18 that their respective edges lie between the center and outer periphery of recess 19; and the blend of material discharged at point 16 into recess 19 is therefore laid up in said recess 19 along a radius of the recess. During this lay-up, charge box 18 is rotated as at 20 to distribute the material evenly and with circular symmetry along the complete circular cross section of recess 19, with the rate of rotation merely being sufficiently fast to assure a smooth and symmetrical lay-up of the dielectric material in charge box 18.

The desired variation in dielectric constant across the radii of the granular substantially cylindrical mass deposited in recess 19 is effected by reason of the aforementioned rotation of charge box 18, cooperating with the contoured gates 14 and 15. The actual contour of these gates is selected in accordance with the particular type of lens which it is desired to finally produce; and in the case of a Luneberg lens, the contours of said gates 14 and 15 may be similar to those shown in FIGURE 1B. In such a Luneberg lens, the refractive index ($n$) should vary in accordance with Equation 1 given previously; and this may be expressed also as a variation in relative dielectric constant ($\epsilon$) by the equation:

$$\epsilon = 2 - \left(\frac{r}{R}\right)^2 \qquad (2)$$

where, $R$ = the lens radius (or the conveyor belt width in the arrangement of FIGURE 1A),
$r$ = the radial variable in planes parallel to the bottom of recess 19, and
$\epsilon$ = the relative dielectric constant of the material corresponding to any particular point $r$.

For such a relationship, the contour of gate 14, associated with the high index blend 17 in hopper 10, can be expressed by the equation:

$$h_1 = \frac{Kx}{R}\left(1 - \frac{x^2}{R^2}\right) \{0 \leq X \leq R\} \qquad (3)$$

where, $R$ = the radius of the lens
$x$ = the distance variable across conveyor belt 12 (corresponding to the radial variable of the lens; see also FIGURE 1B); and K=a feeder constant, equal to $H/(\epsilon_{max}-1)$, where H is the maximum gate opening achievable.

In addition, the contour of gate 15, associated with the hopper 11 containing plain polystyrene beads, can be expressed by the equation:

$$h_2 = \frac{K}{R}(\epsilon_{max.}-1)x - h_1\{0 \leq X \leq R\} \quad (4)$$

Each of the variables in Equation 4 have been discussed previously.

The two gates 14 and 15 are maintained in fixed position relative to conveyors 12 and 13, and provide a substantially constant (with time) flow of material at discharge point 16. In addition, the contours of the two gates are so selected as to achieve the desired smooth gradation in dielectric constant across the radius (or diameter) of recess 19 as the charge box 18 is rotated. In effect, gates 14 and 15 achieve this desired gradation in dielectric constant by effecting an appropriate variation in the loading of the blend across the radius R of recess 19, at position 16. The said gates 14 and 15 moreover cooperate with one another to achieve a combined flow having a smoothly varying rate at different points along the radius of recess 19; and the actual deposition of material follows the substantially triangular configuration shown at 21 in FIGURE 1B, comprising substantially zero flow at the center of the recess 19 and maximum flow at the circumference of said recess 19. This triangular dumping or depositing of the granular dielectric material assures that a substantially smooth lay-up of said material is achieved in cylindrical recess 19 as charge box 18 is rotated.

It will be appreciated, of course, that arrangements alternative to those shown in FIGURES 1A and 1B are available to achieve substantially similar final results. By way of example, as mentioned previously, gates and conveyors of diameter length can be employed. Alternatively, the conveyor belts 12 and 13 rather than having a width substantially equal to the radius of recess 19, and rather than being associated with contoured gates such as 14 and 15, can be replaced by small capacity feeders having a width much less than the radius of the charge box and cooperating with uniform ganged gates. With this particular alternative arrangement, the actual dielectric constant of the material flowing along the small capacity feeders can be appropriately programmed such that the value at egress is as required for a given lens configuration, e.g., in accordance with Equations 3 and 4 for a Luneberg lens; and the charge box can also be position-programmed, i.e., rotated and translated, with corresponding changes of the dielectric constant of the material flowing toward the charge box, all to achieve the necessary smooth lay-up and substantially continuous dielectric constant variation which is desired.

The charge box 18, and particularly the recess 19, is filled with material in accordance with the techniques described. It will be appreciated, of course, that charge box 18 may itself comprise a mold if practicable, and as such could be devised to allow formation of a continuous fused cylindrical length which (after fusion) could be separated into individual cylinders of required height. After charge box (or mold) 18 is filled, the lay-up may then be fused into a complete and homogeneous cylindrical unit, e.g., by a steam molding process. An apparatus such as that shown in FIGURE 1C may be employed to this effect, whereby the charge 22 in the final lay-up may be subjected to steam flow through pipe 23, the opposite side of the apparatus being coupled to a vacuum exhaust 24. In such a steam molding step, the arrangement shown in FIGURE 1C is particularly desirable since it achieves steam flow in directions normal to the lens surface; and such flow is highly preferred in order that any density shifts which might occur during fusion may be accommodated from a dielectric standpoint in the subsequent lens fabrication.

After completion of the fusion process, the fused lens 25 may be unmolded as shown in FIGURE 1D; and said lens 25 may then be heat-treated for an extended period of time to effect removal of all moisture therefrom, as well as to insure dimension stability. In a typical case, moisture removal and stress relief can be effected in a stabilization room wherein fused lens 25 is subjected to a constant temperature of approximately 170° F. for a period of three to seven days.

The resulting mass 25 is, it will be appreciated, of cylindrical configuration and defines a smoothly varying dielectric constant gradation along its radii. The outermost surface of cylindrical mass 25 is substantially comprised of plain polystyrene beads only whereby this outer surface has a dielectric constant which closely approximates that of surrounding air. In the final lens, whether it be a cylindrical lens of the type shown at 25 or a three-dimensional lens of the type with which the present invention is primarily concerned, dielectric discontinuities at the outer surface of the lens are substantially eliminated, thereby minimizing losses as energy passes into or out of the lens. It will be further appreciated that the graded cylinder 25 is formed readily and relatively inexpensively by a unique and reproducible process. Accordingly, once the initial fabrication technique shown in FIGURES 1A through 1D has been finalized, highly uniform three-dimensional lenses can be made in mass production.

It should further be noted that, once the cylindrical lens 25 has been completed, it is immediately possible and indeed desirable to test the cylinder at the ultimate frequency of operation, prior to subsequent fabrication steps. By such a testing technique at this point in the fabrication, the lens quality and focal point can be readily established; and if it departs from that desired, the artificial dielectric media, and/or the loading concentration therein, can be appropriately changed before continuing with the fabrication. This, in itself, represents a significant saving in money and labor over techniques suggested heretofore, since it assures that proper performance of the final three-dimensional lens can be achieved even before that lens is assembled. No known prior scheme facilitates performing non-destructive evaluation of construction modules which perform substantially as individual focusing devices. By such a testing technique, the actual dielectric gradation across the lens can be evaluated and if it is found that this gradation departs from that actually desired, simple adjustments of the contours of gates 14 and 15 can be effected to take care of such deviations at the particular point of lay-up where the discrepancy has occurred.

In actual practice, the necessary gate contours may be verified by destructively testing (as small cubes) a slab of the first cylinder fabricated, whereafter no further gate contour adjustment is necessary. Subsequently fabricated cylinders can then be tested as lenses to assure that deviations in other system parameters, such as dielectric value, have not occurred. With such adjustment of the gate contour and/or dielectric media, the accuracy of the final lens can be immediately assured; and this accuracy can further be guaranteed to persist as multiple such lenses are fabricated.

The next step in the fabrication of a three-dimensional lens, starting with a two-dimensional graded cylinder such as 25, or starting with a cylinder having a stepped index formed, for example, by assembling plural concentric annular modules, is to saw the starting cylinder into a plurality of identical cylindrical, or lunar, or "orange-slice" shaped wedges of relatively large dihedral angle. One such wedge has been shown at 26 in FIGURE 2C. A total of six such wedges 26a through 26f may, for example, be taken from a single cylinder 25 as shown in FIGURE 2B; and each such wedge extends from the circular sides of the starting cylinder to a centrally disposed parting plane 27 extending across a diameter of cylinder 25. In practice, cylinder 25 may initially be sawed in half along plane 27; but this is not necessary and the cylinder can alternatively be sawed along planes angularly disposed to one another and intersecting one another at 27 as shown in FIGURE 2B whereby plane 27 becomes a natural parting plane. Each of the wedges 26 (or 26a through f) defines a dihedral angle $\theta$; and said angle $\theta$ may be 15° when twenty-four similar wedges 26 are to be employed in the final lens, or it may be 10° when thirty-six such wedges are to be employed. Variations can, however, be effected both in the number of wedges and in the angle $\theta$ thereof; and either like angled, or differently angled, wedges can be used in the final assembly. It should, moreover, be noted that the wedges 26a through f can be cut to true size initially, e.g., with a band saw; and it has been found in practice that the plane cuts can be made with such a band saw, yielding wedges accurate to approximate ¼° and less. In the alternative, the wedges can be cut over-sized and then finished to size by planing or sanding techniques. In either case, however, it is important that the sides of the wedges comprising interfaces in the final lens be accurately planar to avoid discontinuities at said interfaces.

A plurality of wedges such as 26 can then be assembled into a three-dimensional body approximating a sphere. The wedges so assembled can, as mentioned, be geometrically identical; but, for any given lens, the wedge dihedrals need not actually be the same for all modules. For example, to assure a proper juncture at every interface at the time of assembly, two small angle wedges can be used in conjunction with a number of larger angle wedges. The wedge assembly can, if desired, be effected by means of a clamping apparatus, such as that shown in FIGURES 3A through 3C, comprising a substantially open rectangular jig 30 having cross members 31 and 32 associated respectively with a pair of dished pole caps 33 and 34. A pair of abutments 35 and 36, comprising for example swingable hinges, support thereon a circular equatorial clamp 37 having a plurality of plates or "shoes" 38 (one for each wedge) hingedly connected to the inner edge of said clamp 37. The various lunar or "orange-slice" wedges 26 may, as shown in FIGURE 3A be inserted in abutting relation to one another within pole caps 33 and 34 whereafter abutments 35 and 36 can be swung back and the equatorial clamp 37 dropped into position as shown in FIGURE 3B. This in turn causes the various plates or "shoes" 38 to move into conforming position relative to the outermost surface of each wedge 26 so as to hold the various wedges in assembled relation. Prior to removal of the circular equatorial clamp 37, the entire body of assembled wedges can be bound together, e.g., by means of narrow fiberglass tape, such as at 39, applied in great circles about the lens. By this means, a temporary assembly is achieved to allow future disassembly if desired; and due to this temporary assembly, any minor sizing errors which might effect wedge separation and air interfaces to exist can be readily corrected prior to final assembly, thereby assuring a perfect match at these interfaces. By the technique described, therefore, dielectric discontinuities at the interfaces are rendered non-existent.

It should, moreover, be noted that the assembly technique described in FIGURES 3A through 3C comprises a "dry" assembly, with the final lens being held in assembled relation by the lengths of tape mentioned previously and/or by means of a final outer shell of plastic materials which can be subsequently applied to the lens exterior, e.g., a ½₂ inch glass-reinforced polyester resin shell. This dry assembly also represents a significant improvement over techniques suggested heretofore, wherein lens subcomponents were assembled into a larger lens by copious use of cement or glue at the subcomponent interfaces. The dielectric constant of cements presently available for such purposes is never the same as that of the subcomponents themselves, wherefore the very use of such cement at the interfaces tends to produce dielectric discontinuities, wave reflections and diffractions, and losses at the interfaces. Even if the "dry" construction described is not employed, however, and a bonded construction using adhesives adjacent the wedge interfaces is substituted, the technique and wedge configuration of the present invention still effect significant improvements. The equatorial plane interfaces associated with the wedge array allow use of a minimum quantity of adhesive; and, in practice, radial strips, circular bands, etc., of cement suffice. Undesirable wave dispersions is therefore minimized.

The final lens 40 is shown diagrammatically in FIGURES 4A and 4B; and, as will be appreciated from these figures, the lens may be considered to comprise a plurality of sections described by plural great circles having common intersections at poles 41 and 42 of the lens. Moreover, by reason of the technique described, the final three-dimensional lens comprises a very good approximation of spherical symmetry, and achieves a continuous dielectric gradient variation in three dimensions by means of a varying loading element concentration in substantially all radial directions, even though the individual lens segments as initially fabricated exhibited a two-dimensional gradient only.

In the course of fabricating wedges of the type shown in FIGURE 2C, and in subsequent assembly of those wedges in the manner described with reference to FIGURES 3A through 3C, problems sometimes arise in the region of poles 41 and 42 of the final lens. In particular, the material comprising the wedges 26 is rather brittle; and the wedge dimensions in the pole regions (and indeed throughout the central core of the lens 40) is very thin. Unless great care is taken during the wedge fabrication and assembly steps, therefore, some breakage may occur in either the pole or core areas of the individual wedges; and as a result, some air spaces may be produced at the time of final assembly with resultant undesirable dielectric discontinuities. In order to obviate even these problems which would tend to militate against optimum performance, the fabrication steps may further include steps of the type shown in FIGURES 5–5B or 6–6B. In particular, as shown in FIGURE 5, the lens 40 may be fabricated to define a conical recess 45 at each of its poles 41 and 42, each which recesses can be filled with a preshaped conical piece 46 preferably, but not necessarily, of length equal to the lens radius. The conical recesses, such as 45, can be made by reaming the polar regions of the lens after the wedges have been assembled; or, in the alternative, the various wedges 26 can (as shown in FIGURE 5A) be initially cut to remove their end areas 47 and 48 prior to final assembly. The conical segment 46 can, moreover, be formed by cutting a pie-shaped wedge 49 (see FIGURE 5B) from the side of a cylinder 25 formed in accordance with the technique of FIGURES 1A through 1D; and this pie-shaped piece 49 can then be turned to form a cone, such as 46.

To assure the elimination of air discontinuities throughout the central core of the lens, arising as a result of wedge edge breakage or edge meeting problems, an alternate technique of the type shown in FIGURE 6 can also be employed. In this case, the lens 40 can be bored as at 50 throughout its central core between the poles 41 and 42; or, in the alternative, the various wedges 26 may have an elongated portion 51 removed therefrom, along the thin edge thereof, prior to assembly of the several wedges 26. This open core area 50 can then be entirely filled with an elongated bar 52 turned, for example, from a rectangular bar 53 (see FIGURE 6B) cut from a diametrical portion of a cylinder 25. By using the particular cutting arrangements shown in FIGURE 5B for the polar cones, or as shown in FIGURE 6B for the core rod, the dielectric graduation in the pole piece 46 or core piece 52 approximates that otherwise necessary in the removal region of the lens 40 (provided the cone or core face diameter is small with respect to the lens circumference) thereby avoiding any discontinuity problems.

The technique thus described can be employed to fabricate not only Luneberg lens, but also other lenses having different refractive considerations, simply by appropriate choice of the dielectric gradation or loading material concentration, e.g., through appropriate contouring of the gates 14 and 15 (see FIGURE 1A). The technique can moreover be utilized to form lenses of any desired size, limited only by the size of molds which are available to receive the initial charge. Due to such physical limitations, i.e., mold size, etc., the present invention is particularly useful in the construction of relatively small diameter dielectric lens (less than ten feet in diameter); and in a typical case, the technique has been employed to fabricate a substantially spherical lens measuring approximately three feet in diameter and weighing approximately twenty-five pounds. Both smaller and large lens fabrication, however, can be effected.

While I have thus described a preferred technique and embodiment of the present invention, many variations will be suggested to those skilled in the art, and certain of these variations have in fact been described. Still other variations and modifications will, however, become apparent from the foregoing description; and all such variations and modifications as are in accord with the principles of the present invention are meant to fall within the scope of the appended claims.

Having thus described my invention, I claim:

1. A three-dimensional dielectric lens comprising a plurality of substantially identical orange-slice shaped wedges each of which has a thin substantially linear edge connected by angularly inclined planar sides to a substantially semi-circular variably thickened edge, each of said wedges comprising a dielectric material having a varying concentration of conductive slivers embedded therin with the concentration of said slivers being at a maximum adjacent the center of the thin edge of said wedge and decreasing in all directions from said center to a minimum adjacent the thickened edge of said wedge to effect a variation in dielectric constant in each wedge in directions normal to said thickened edge thereof, each of said wedges exhibiting substantially the same density at all portions thereof between the thickened and thin edges thereof, said wedges being secured to one another with their several thin edges being disposed in closely adjacent aligned relation and with the planar sides of adjacent ones of said wedges being in direct contiguity with one another.

2. The lens of claim 1 wherein the dielectric constant variation in said directions normal to said thickened edge of each said wedge is a smooth substantially continuous variation.

3. The lens of claim 1 wherein the dielectric constant variation in said directions normal to said thickened edge of each said wedge is an incremental stepped variation.

4. The lens of claim 1 wherein the angularly inclined planar sides of at least some of said wedges define a dihedral angle in the order of 10° to 15°.

5. A three-dimensionally graded dielectric lens of substantially spherical configuration comprising a plurality of tapered lens sections each of which has a relatively narrow edge portion disposed adjacent the center of said substantially spherical lens, each of said lens sections having a pair of angularly inclined smoothly planar sides congruent with and disposed in directly contiguous relation to like planar sides of adjacent ones of said lens sections, each of said lens sections being of substantially constant density and having a smoothly varying dielectric gradient in at least two dimensions, and means adjacent the outermost surface only of said substantially spherical lens for holding said lens sections in assembled side-by-side engagement with one another.

6. The lens of claim 5 wherein each of said lens sections is of substantially orange-slice configuration, the sides of each lens section being inclined to one another by an angle in the order of 10° to 15°, the narrow edge portions of said sections being substantially linear and being disposed adjacent a common line passing through a pair of opposed polar regions in said lens.

7. The lens of claim 5 wherein each of said lens sections comprises an artificial dielectric material consisting of a conductive sliver-loaded dielectric material, said smoothly varying dielectric gradient being effected by at least a two-dimensional variation in the loading concentration of said slivers in each said lens section, said loading concentration being at a maximum adjacent the center of the relatively narrow edge portion of each said lens section and decreasing in all directions from said center.

References Cited
UNITED STATES PATENTS

| 2,716,190 | 8/1955 | Baker | 343—911 |
|---|---|---|---|
| 3,185,993 | 5/1965 | Mangulis | 343—911 |

OTHER REFERENCES

Robinson: Three-Dimensional Microwave Lens, Tele-Tech & Electronic Industries, November 1954, pp. 73, 124 (copy 343–911L).

ELI LIEBERMAN, Primary Examiner